(12) United States Patent
Bai et al.

(10) Patent No.: US 10,360,538 B2
(45) Date of Patent: Jul. 23, 2019

(54) PREDICTING POLLUTION FORMATION ON INSULATOR STRUCTURES OF POWER GRIDS

(71) Applicant: International Business Machines Corporation, Armonk, NY (US)

(72) Inventors: Xin Xin Bai, Beijing (CN); Jin Dong, Beijing (CN); Hui Du, Beijing (CN); Xiao Guang Rui, Beijing (CN); Hai Feng Wang, Beijing (CN); Xi Xia, Beijing (CN); Bao Guo Xie, Beijing (CN); Wen Jun Yin, Beijing (CN); Meng Zhang, Beijing (CN); Ya Nan Zhang, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 785 days.

(21) Appl. No.: 14/601,887

(22) Filed: Jan. 21, 2015

(65) Prior Publication Data
US 2015/0213364 A1 Jul. 30, 2015

(30) Foreign Application Priority Data
Jan. 28, 2014 (CN) .......................... 2014 1 0042448

(51) Int. Cl.
*G06Q 10/00* (2012.01)
*G06Q 10/04* (2012.01)

(52) U.S. Cl.
CPC ............ *G06Q 10/20* (2013.01); *G06Q 10/04* (2013.01)

(58) Field of Classification Search
CPC ............................ G06Q 10/20; G06Q 10/04
See application file for complete search history.

(56) References Cited

U.S. PATENT DOCUMENTS

| 8,190,552 B2 | 5/2012 | Kim et al. |
| 8,456,168 B2 | 6/2013 | Hyde et al. |

FOREIGN PATENT DOCUMENTS

| CN | 101667144 A | 9/2009 |
| CN | 101893674 A | 11/2010 |

(Continued)

OTHER PUBLICATIONS

Gencoglu, Muhsin Tunay, and Murat Uyar. "Prediction of flashover voltage of insulators using least squares support vector machines." Expert Systems with Applications 36.7 (2009): 10789-10798.*

(Continued)

*Primary Examiner* — Scott A. Waldron
*Assistant Examiner* — Kevin W Figueroa
(74) *Attorney, Agent, or Firm* — Cantor Colburn LLP; Grant Johnson

(57) ABSTRACT

A method and a device for predicting insulator pollution grade includes acquiring prediction data affecting the insulator pollution grade; acquiring current pollution status of the insulator; predicting the insulator pollution grade based on the prediction data, the current pollution status and an insulator pollution grade calculating model, wherein the insulator pollution grade calculating model at least comprises an initial pollution status variable of the insulator, and a pollutant accumulation prediction and a pollutant reduction prediction based on the initial pollution status variable, at least one of the accumulation prediction and the reduction prediction being associated with the prediction data, and the initial pollution status variable being associated with the current pollution status.

14 Claims, 3 Drawing Sheets

(56) References Cited

FOREIGN PATENT DOCUMENTS

| CN | 101976424 A | 2/2011 |
|---|---|---|
| CN | 202887440 U | 4/2013 |
| CN | 103473445 A | 12/2013 |

OTHER PUBLICATIONS

Farzaneh, M., et al. "Selection of station insulators with respect to ice and snow-part II: methods of selection and options for mitigation." IEEE transactions on power delivery 20.1 (2005): 271-277.1.*

Felix Amarh, "Electric Transmission Line Flashover Prediction System," Ph.D. Thesis and Final Report, Arizona State University, Power Systems Engineering Research Center, May 2001, pp. 1-181.

Y. Ge, et al., "Detection of the Insulator Dirtiness Based on the Computer Vision," China International Conference on Electricity Distribution (CICED), Jan. 2006, pp. 1-4.

Jun Yi, et al., "The Insulator's Pollution Raining Flashover Forecasst under Garch-Based Forecast of Rainstorm Disasters," Advanced Materials Research, Oct. 2010, pp. 566-570.

X. Jun, et al., "The Building of Region Power Grid Polluted Flashover Precaution System based on GIS," International Conference on E-Product E-Service and E-Entertainment (ICEEE), Nov. 2010, pp. 1-4.

Xu Jianyuan, et al., "Study of Polluted Insulator Flashover Forecasting Based on Nonlinear Time Series Analysis," International Conference on High Voltage Engineering and Application, Nov. 2008, pp. 148-151.

Hefei University of Technology, Master Dissertation, "Weather Statistics filthy and dirty flash design and application of early warning", Dec. 15, 2011.

South China University of Technology, "Study on dynamic contamination Deposit on the Suspension Insulators of Power Transmission Line", Apr. 15, 2011.

X. Jianyuan et al., "Risk Forecasting of Contaminated Insulator Flashover Using Double Artificial Neural Networks", Transactions of China Electrotechnical Society, vol. 23. No. 12, Dec. 31, 2008.

Z. Jianxiang, "Research on the Forecasting Method for the Pollution Severity of Suspension-type Porcelain Insulators", May 15, 2007.

* cited by examiner

PREDICTING POLLUTION FORMATION ON INSULATOR STRUCTURES OF POWER GRIDS

FOREIGN PRIORITY

This application claims priority to Chinese Patent Application No. 201410042448.X, filed Jan. 28, 2014, and all the benefits accruing therefrom under 35 U.S.C. § 119, the contents of which in its entirety are herein incorporated by reference.

BACKGROUND

The present invention relates to prediction on insulator pollution, and more specifically, to a method and a device for predicting insulator pollution based on factors such as weather and the like.

In a power grid, substances in the air, such as dust, sea salt and the like, may accumulate on insulators to form pollution, which is a primary reason for electricity leakage which in turn leads to flashover of the insulator. This is especially the case in coastal areas, due to the presence of sea salt in the air, which in turn is one of the main factors resulting in the loss of power grids. Much labor and material resources are used to prevent insulator flashover every year.

In order to reduce the occurrences of flashover caused by insulator pollution, it is possible to utilize an anti-pollution-flashover coating to enhance the anti-pollution ability of insulator string. Although this measure may delay, to a certain extent, the occurrence of an accident, it does not address and solve the problem on a fundamental level.

The primary approach for preventing pollution flashover in a power grid is to periodically conduct inspection and perform cleaning. A local power supply station typically specifies a plan for conducting such inspection and cleaning based on a pollution area distribution map that is issued periodically. However, the existing pollution area distribution is determined normally by locations of lines (e.g., the distance from coast line, an industry pollution area and so on) and insulator pollution samples collected, and such pollution area distribution is updated slowly, with a large error compared with the actual situation. Thus, it would result in non-thorough cleaning of insulator pollution, and be incapable of avoiding insulator flashover.

In the prior art, it is also possible to use a measuring device based on x-ray to measure salt density and dust density on an insulator, and then send the measured data to a data center to determine the pollution area distribution. However, it is difficult to widely apply this method in the industry field, for reasons such as: instruments are mounted on lines at a very high cost; the data transmission needs wireless networks, resulting in high cost; and such measuring devices cannot operate for extended periods of time in a harsh coastal environment where humidity is high and salinity is high.

Therefore, there is a need to improve the existing insulator pollution prediction scheme, so as to provide a convenient and prompt insulator pollution prediction solution.

SUMMARY

According to the first aspect of the present invention, there is provided a method for predicting insulator pollution grade, comprising acquiring prediction data affecting the insulator pollution grade; acquiring current pollution status of the insulator; predicting the insulator pollution grade based on the prediction data, the current pollution status and an insulator pollution grade calculating model, wherein the insulator pollution grade calculating model at least comprises an initial pollution status variable of the insulator, and a pollutant accumulation prediction and a pollutant reduction prediction based on the initial pollution status variable, at least one of the accumulation prediction and the reduction prediction being associated with the prediction data, and the initial pollution status variable being associated with the current pollution status. In an improved embodiment, it is also capable of predicting pollution flashover based on the insulator pollution grade predicted by the solution of the present disclosure.

According to the second aspect of the present invention, there is provided a schematic diagram of a device for predicting insulator pollution grade, the device comprising: a first acquiring module, configured to acquire prediction data affecting the insulator pollution grade; a second acquiring module, configured to acquire the current pollution status of the insulator; a predicting module, configured to predict the insulator pollution grade based on the prediction data, the current pollution status and an insulator pollution grade calculating model, wherein the insulator pollution grade calculating model at least includes the initial pollution status variable of the insulator, and a pollutant accumulation prediction and a pollutant reduction prediction on the basis of the initial pollution status variable, at least one of the accumulation prediction and the reduction prediction being associated with the prediction data, and the initial pollution status variable being associated with the current pollution status.

With the method and device according to the present invention, it is able to improve the prediction on insulator pollution.

BRIEF DESCRIPTION OF THE DRAWINGS

Through the more detailed description of some exemplary embodiments of the present disclosure in the accompanying drawings, the above and other objects, features and advantages of the present disclosure will become more apparent, wherein the same reference generally refers to the same components in the exemplary embodiments of the present disclosure.

DETAILED DESCRIPTION

Figure 1:
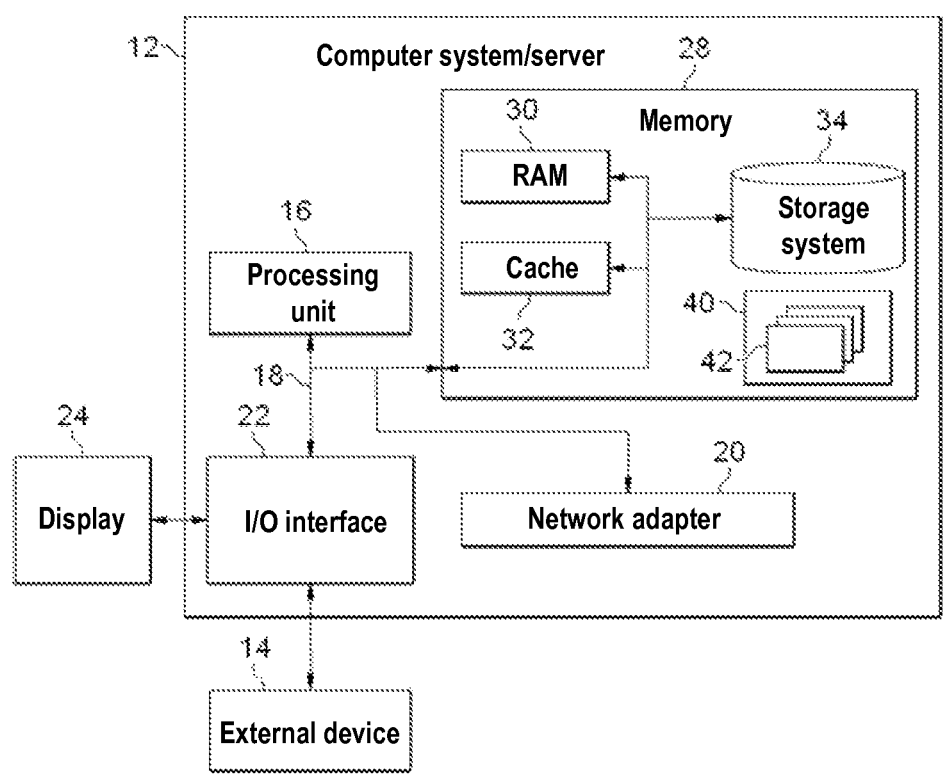
FIG. 1 shows a block diagram of an exemplary computer system/server 12 applicable to implement an embodiment of the present invention.

Exemplary embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the functions/acts specified in the flowchart and/or block diagram block or blocks.

The computer program instructions may also be loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows a block diagram of an exemplary computer system/server 12 which is applicable to implement the embodiments of the present invention. The computer system/server 12 shown in FIG. 1 is only illustrative and is not intended to suggest any limitation on the scope of use or functionality of embodiments of the invention described herein.

As shown in FIG. 1, the computer system/server 12 is shown in the form of a general-purpose computing device. The components of computer system/server 12 may include, but are not limited to, one or more processors or processing units 16, a system memory 28, and a bus 18 that couples various system components (including a system memory 28 and a processor 16).

Bus 18 represents one or more of several types of bus architectures, including a memory bus or memory controller, a peripheral bus, an accelerated graphics port, and a processor or a local bus using any of a variety of bus architectures. By way of example, such architectures include, but are not limited to, an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

Computer system/server 12 typically includes a variety of computer system readable media. Such media may be any available media that is accessible by the computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 3 and typically called a "hard drive"). Although not shown in FIG. 1, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The memory 28 may include at least one program product having a set of program modules (e.g., at least one module) that are configured to carry out the functions of embodiments of the invention.

Program/utility 40, having a set of (at least one) program modules 42, may be stored in the memory 28 for example, and such program modules 42 include, but are not limited to, an operating system, one or more application programs, other program modules, and program data. Each of these examples, the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 (e.g., a keyboard, a pointing device, a display 24, etc.); one or more devices that enable a user to interact with the computer system/server 12; and/or any devices (e.g., a network card, a modem, etc.) that enable the computer system/server 12 to communicate with one or more other computing devices. Such communication can occur via Input/Output (I/O) interfaces 22. Still yet, the computer system/server 12 can communicate with one or more networks, for example a local area network (LAN), a general wide area network (WAN), and/or a public network (e.g., the Internet) via a network adapter 20. As depicted, the network adapter 20 communicates with the other components of the computer system/server 12 via the bus 18. It should be understood that although not shown, other hardware and/or software components could be used in conjunction with the computer system/server 12. Examples include, but are not limited to: microcode, device drivers, redundant processing units, external disk drive arrays, RAID systems, tape drives, and data archival storage systems, etc.

Figure 2:
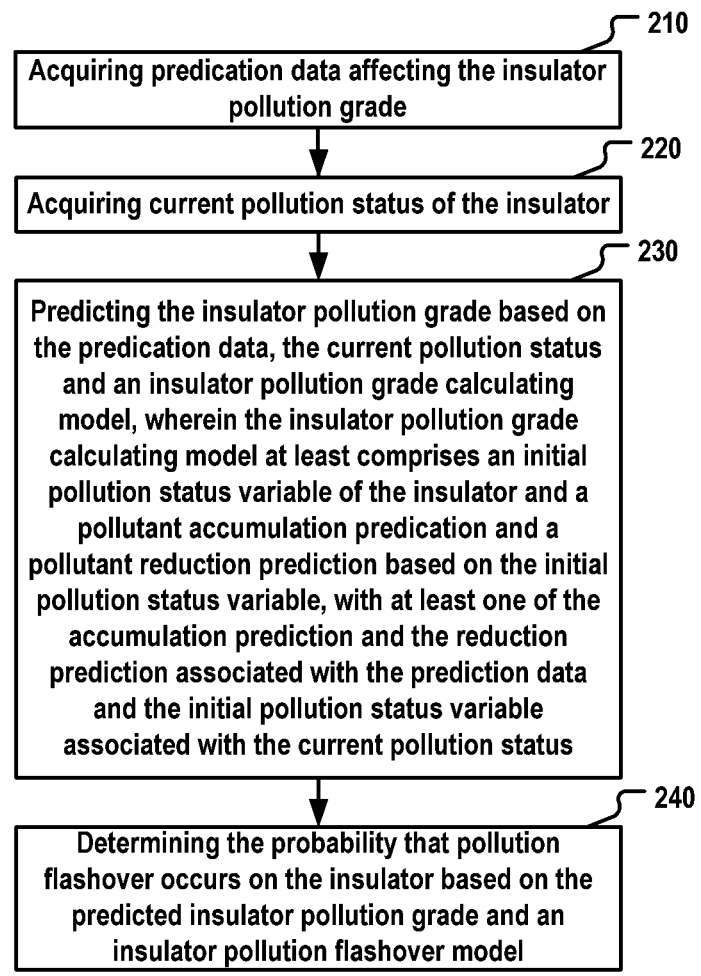
FIG. 2 shows a method flowchart for determining the grade of insulator pollution according to an embodiment of the present invention.

With reference now to FIG. 2, FIG. 2 shows a method flowchart for predicting the grade of insulator pollution according to an embodiment of the present invention. As shown in FIG. 2, the method at least includes: Block 210, acquiring prediction data affecting the insulator pollution grade; Block 220, acquiring current pollution status of the insulator; Block 230, predicting the insulator pollution grade based on the prediction data, the current pollution status and an insulator pollution grade calculating model, wherein the insulator pollution grade calculating model at least comprises an initial pollution status variable of the insulator and a pollutant accumulation prediction and a pollutant reduction prediction based on the initial pollution status variable, wherein at least one of the accumulation prediction and the reduction prediction is associated with the prediction data and the initial pollution status variable is associated with the current pollution status.

In Block 210, the prediction data affecting the grade of insulator pollution is acquired.

The grade of insulator pollution is affected by many factors including not only relatively stable factors but also predictable factors. Factors, such as concentration of salt in the air, the distance from coastline, topography, surrounding buildings etc., are relatively stable, without necessity of being predicted, however these factors will affect changes of the pollutants more steadily over time. Factors, such as wind speed, wind direction, rainfall, air moisture, etc., would affect the grade of insulator pollution as well, and these factors are relatively instable however predicable. In particular, the prediction data includes at least one of: weather data, environment data and geographic data.

It is possible to obtain the prediction data from existing commercial data, for example, weather data or geographic data from National Centers for Environmental Prediction (NCEP), National Center for Atmospheric Research (NCAR), European Centre for Medium-Range Weather Forecasts (ECMWF), National Oceanic and Atmospheric Administration (NOAA) and the like. The weather data and geographic data are generally stored and exchanged in the form of lattice points, and the lattice point data is well known by one skilled in the art. It is easy to extract from the lattice point data the desired weather data, geographic data and so on. An aspect of the present disclosure is how to use the prediction data from lattice point data, thus the details of the lattice point data are omitted here.

In Block 220, the current pollution status of the insulator is obtained.

In an embodiment, determination of the current pollution status comprises: a basic pollution status is determined based on the position of the insulator in the pollution area distribution; and then the current pollution status is determined after the basic pollution status is updated.

The pollution area distribution shows the distribution situation of insulator pollution grades within a specific area. The pollution area distribution may be determined in various modes. In one embodiment, it is possible to use the existing pollution area distribution data, that is, a first pollution area distribution determined based on a historical data. In another embodiment, it can be determined on the basis of the insulator pollution grade determined by the solution of the present disclosure, that is, a second pollution area distribution which is determined based on the first pollution area distribution and the insulator pollution grade calculating model. The particular operations may include: the insulator pollution grade of each lattice point is determined based on the first pollution area distribution and the insulator pollution grade calculating model; and then the pollution area distribution of some specific area is determined based on the insulator pollution grade of each lattice point, as the second pollution area distribution.

In Block 230, the insulator pollution grade is predicted based on the prediction data, the current pollution status and the insulator pollution grade calculating model, wherein the insulator pollution grade is determined at least based on the current pollution status of the insulator, and the pollutant accumulation prediction and the pollutant reduction prediction which are on the basis of the current pollution status, with at least one of the accumulation prediction and the reduction prediction associated with the prediction data and the initial pollution status variable associated with the current pollution status.

In this block, the pollution status on a certain moment in future is predicted based on the current pollution status of the insulator in combination with the pollution changes. The pollution changes may include pollutant increase and pollutant decrease. The above mentioned weather factor and geographic factor would both result in the increase or decrease of pollutant.

In a particular embodiment, the pollutant accumulation prediction is at least associated with the air density, speed and humidity contained in the prediction data. In another embodiment, the pollutant reduction prediction is at least associated with the rainfall rate contained in the prediction data. Of course, one skilled in the art may consider prediction data of other types in the pollutant accumulation prediction and the pollutant reduction prediction.

Compared with the prior art, the insulator pollution grade of the present application is not obtained by directly using the pollution area distribution data determined periodically, and such insulator pollution grade determined by the periodic pollution area distribution data is static and cannot reflect the current actual pollution status. Therefore in the technical solution of the present disclosure, two dynamical factors, pollution increase and pollution elimination, are simultaneously taken into consideration according to the prediction data, which can carry on real-time and accurate prediction on insulator pollution.

In the following, the insulator pollution grade calculating model is exemplarily described by equations (1), (2), (3) and (4):

$$\frac{\partial I}{\partial t} = \frac{\partial S}{\partial t} + \frac{\partial W}{\partial t} \qquad \text{Equation (1)}$$

In Equation (1), I represents the insulator pollution grade; S represents pollutant accumulation; and W represents pollution elimination. Therefore, the partial differentiation of S versus time represents the accumulation of pollutant over time in the model; and the partial differentiation of W versus time represents the reduction of pollutant over time, combination of the two capable of representing pollution concentration change over time (the partial differentiation of I versus time).

$$S = \rho D V \cdot e^{-r^2 + RH} \qquad \text{Equation (2)}$$

Equation (2) is an example of the pollutant accumulation S; D represents the average sea salt concentration in the area where the insulator is located; $\rho$ represents the air density; V represents the air speed; r represents the vertical distance from the insulator to the coastline; and RH represents the relative humidity of the air.

$$W = I_0 L \cdot (1 - e^{-R}) \qquad \text{Equation (3)}$$

Equation (3) is an example of the pollutant elimination W, wherein, $I_0$ is the initial pollution status variable of the insulator; L represents an elimination coefficient which can be obtained by test measurement; and R represents rainfall rate.

Therefore if the pollutant concentration I at the moment t2 in future is to be predicted based on the current time t1, it can be obtained by integration operation on Equation (1), wherein the individual parameters in Equation (1) are set referring to the embodiments of Equations (2) and (3). The result of the integration can especially refer to Equation (4):

$$I = I_0 \int_{t1}^{t2} \rho D V \cdot e^{-r^2 + H} \cdot dt + \int_{t1}^{t2} I_0 L \cdot (1 - e^{-R}) \qquad \text{Equation (4)}$$

The current pollution status of the insulator is associated with the initial pollution status variable $I_0$ in the insulator pollution grade calculation model. For example, in Equation (4), the initial pollution status variable I0 can be determined based on the current pollution status of the insulator, and further, the insulator pollution grade I at the moment t2 in future may be determined by calculating the integration equation. In Equation (4), the pollutant accumulation prediction is represented as $\int_{t1}^{t2} \rho D V \cdot e^{-r^2 + RH} \cdot dt$; and the pollutant reduction prediction is represented by the equation $\int_{t1}^{t2} I_0 L \cdot (1 - e^{-R}) \cdot dt$.

The embodiment of determining the current pollution status of the insulator mentioned above also includes: determining the current pollution status after updating the basic pollution status. Since the insulator pollution grade still changes after the pollution area distribution being determined, it is necessary to update the basic pollution status according to events occurring between the moment when the pollution area distribution is determined and the current moment. In one embodiment, historical weather data between these two moments may be considered, for example, the pollution elimination grade is determined based on the recent rainfall cleaning situation. In another embodiment, it is also possible to consider other factors affecting the insulator pollution grade, for example, whether manual cleaning is performed recently, and if the manual cleaning has been performed, then no pollution exists. As for the embodiment of Equation (4), the value of the initial pollution status variable I0 is determined based on the basic pollution status, and then I0 is adjusted by the update of the accumulated pollution.

The prediction of the insulator pollution may be achieved by the above operations 210, 220 and 230. In an improved embodiment, the embodiment shown in FIG. 2 can further include Block 240 of insulator pollution flashover prediction, which is optional.

In Block 240, the probability that pollution flashover occurs on the insulator is determined based on the predicted insulator pollution grade and the insulator pollution flashover model. The pollution flashover model represents the relationship between the insulator pollution grade and pollution flashover occurrence. Since the prediction on the insulator pollution grade can be enhanced by the above operation, this operation can improve the accuracy of the insulator pollution flashover prediction as well, therefore the location of the insulator to be cleaned can be accurately positioned, further achieving the technical effects of improving cleaning efficiency and reducing cost.

The pollution flashover model can be determined in various modes. In an embodiment, the pollution flashover model represents the relationship between the pollution grade and the fault occurrence which is determined based on power grid historical fault data (e.g., power grid trip record caused by the insulator pollution) and the corresponding insulator pollution grade data. The higher the pollutant concentration is, the higher the risk and probability of pollution flashover occurrence are. In addition, the pollution flashover occurrence is also related to weather factors, e.g., temperature, humidity, pressure, etc. The higher the air humidity is, the higher the risk and probability of pollution flashover occurrence are.

Therefore, in a more specific embodiment, during determining the pollution flashover model, the affections of two factors, the insulator pollution grade and the air humidity, are taken into consideration. This embodiment involves two functions: one is a probability density function f(I) of the pollution flashover probability versus the insulator pollution grade, and the other is a probability density distribution function f(RH) of the pollution flashover probability versus the relative humidity. The pollution flashover occurring probability should be the integration of the probability density function of joint distribution of the two, which can refer to Equation (5):

$$P(I, RH) = \int_{I_1}^{I_2} f(I) dI \int_{RH_1}^{RH_2} f(RH) dRH \qquad \text{Equation (5)}$$

wherein f(I) and f(RH) can be obtained by the historical insulator pollution grade, the relative humidity and the historical information statistics of the electricity transmission line trip events caused by insulator pollution flashovers; I1 and RH1 represent respectively the insulator pollution grade and the relative humidity at the current moment t1; and I2 and RH2 represent respectively the insulator pollution grade and the relative humidity at the moment t2 in future.

In an embodiment, it also includes the visual presentation of the pollution area distribution, which can provide the graphic pollution area distribution and indicate different pollution grades with different colors. In another embodiment, classification of disaster warnings can be performed depending on the predicted insulator pollution flashover probability, for example, blue, yellow, orange, red and the so on are used to indicate pollution flashovers probability with different grades, so as to facilitate specifying different routing inspection and cleaning plan for areas with different pollution flashover grades.

Figure 3:
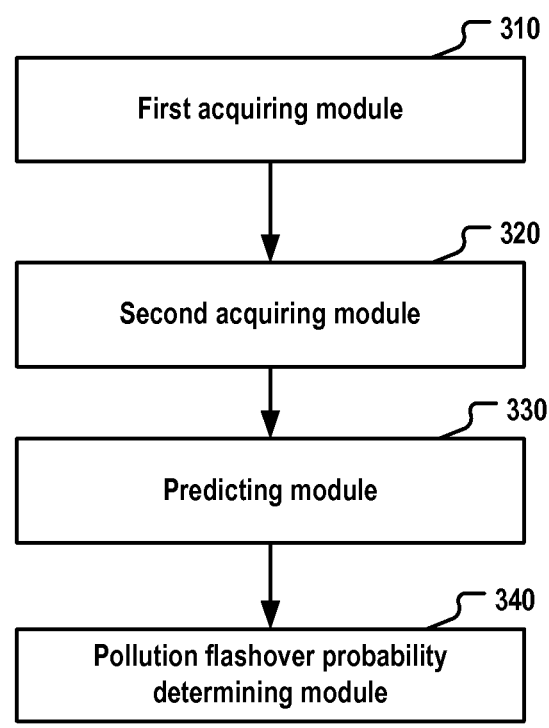
FIG. 3 shows a schematic diagram of a device for determining the grade of insulator pollution according to an embodiment of the present invention.

FIG. 3 shows a schematic view of a device for determining the grade of insulator pollution according to an embodiment of the present invention. The device comprises: a first acquiring module 310, configured to acquire prediction data affecting the insulator pollution grade; a second acquiring module 320, configured to acquire the current pollution status of the insulator; a predicting module 330, configured to predict the insulator pollution grade based on the prediction data, the current pollution status and an insulator pollution grade calculating model, wherein the insulator pollution grade calculating model at least includes the initial pollution status variable of the insulator, and a pollutant accumulation prediction and a pollutant reduction prediction on the basis of the initial pollution status variable, with at least one of the accumulation prediction and the reduction prediction associated with the prediction data and the initial pollution status variable associated with the current pollution status.

In an improved embodiment, the device shown in FIG. 3 can also include a pollution flashover probability determining module 340, configured to determine the probability that pollution flashover occurs on the insulator based on the predicted insulator pollution grade and the insulator pollution flashover model, and the pollution flashover model represents the relationship between the insulator pollution grade and the pollution flashover occurrence.

In an embodiment, the pollutant accumulation prediction is at least associated with the air density, speed and humidity contained in the prediction data. In a more specific embodiment, the pollutant accumulation prediction is represented by equation $\int_{t1}^{t2} \rho DV \cdot e^{-r^2+RH} \cdot dt$, in which D represents the average sea salt concentration in the area which the insulator is located in, $\rho$ represents the air density, V represents the air speed, r represents the vertical distance from the insulator to the coastline, RH represents the relative humidity of the air, t1 represents the time corresponding to the current pollution status of the insulator; and t2 represents a moment in future.

In an embodiment, the pollutant reduction prediction is at least associated with the rainfall rate contained in the prediction data. In a more specific embodiment, the pollutant reduction prediction is represented by equation $\int_{t1}^{t2} I_0 L \cdot (1-e^{-R}) \cdot dt$, wherein I0 represents the initial pollution status variable of the insulator; L represents the elimination coefficient; R represents the rainfall rate; t1 represents the time corresponding to the current pollution status of the insulator; and t2 represents a moment in future.

In an embodiment, the predicting module 320 also comprises: a module configured to determine the basic pollution status based on the position of the insulator in the pollution area distribution; and a module configured to determine the current pollution status after updating the basic pollution status.

In an embodiment, the pollution area distribution is a first pollution area distribution determined based on the historical data. In another embodiment, the pollution area distribution is a second pollution area distribution determined based on the first pollution area distribution and the insulator pollution grade calculating model, and the first pollution area distribution is determined based on the historical data.

In an improved embodiment, the module for determining the second pollution area distribution based on the first pollution area distribution and the insulator pollution grade calculating model comprises: a module for determining the insulator pollution grade of each lattice point based on the first pollution area distribution and the insulator pollution grade calculating model; and a module for determining the second pollution area distribution based on the insulator pollution grade of said each lattice point.

In an embodiment, there is included a module configured to visually present the pollution area distribution. In another embodiment, the prediction data comprises at least one of: weather data, environment data, and geographic data.

With the technical solution of the present invention, the insulator pollution grade can be predicted. When implementing the technical solution of the present invention through the general computer system shown in FIG. 1, the computer system shown in FIG. 1 is used as the hardware device for predicting the insulator pollution grade.

The flowchart and block diagrams in the Figures illustrate the architecture, functionality, and operation of possible implementations of systems, methods and computer program products according to various embodiments of the present invention. In this regard, each block in the flowchart or block diagrams may represent a module, program segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for predicting insulator pollution grade, comprising:
   acquiring, by a processor, prediction data affecting the insulator pollution grade;
   acquiring, by the processor, current pollution status of the insulator;
   predicting, by the processor, the insulator pollution grade based on the prediction data, the current pollution status and an insulator pollution grade calculating model, wherein the insulator pollution grade calculating model at least comprises an initial pollution status variable of the insulator, and a pollutant accumulation prediction and a pollutant reduction prediction based on the initial pollution status variable, wherein the pollutant accumulation prediction is at least associated with air density, air speed and humidity contained in the prediction data, and
   wherein the pollutant accumulation prediction is represented by equation $\int_{t1}^{t2} \rho DV \cdot e^{-r^2+RH} \cdot dt$, in which D represents average sea salt concentration in the area which the insulator is located in, ρ represents air density, V represents air speed, r represents the vertical distance from the insulator to coastline, RH represents relative humidity of the air, t1 represents the time corresponding to the current pollution status of the insulator; and t2 represents a moment in future;
   at least one of the accumulation prediction and the reduction prediction being associated with the prediction data, and the initial pollution status variable being associated with the current pollution status;
   determining the probability that pollution flashover occurs on the insulator based on the predicted insulator pollution grade and an insulator pollution flashover model, wherein the pollution flashover model represents a relationship between the insulator pollution grade and pollution flashover occurrence;
   generating a visual presentation of the current pollution status of the insulator;
   generating a disaster warning, wherein classification of the disaster warning is based at least in part on the pollutant accumulation prediction; and
   adjusting a routing for an inspection and cleaning plan for the insulator based on the current pollution status of the insulator.

2. The method according to claim 1, wherein the pollutant reduction prediction is at least associated with rainfall rate contained in the prediction data.

3. The method according to claim 2, wherein the pollutant reduction prediction is represented by equation $\int_{t1}^{t2} I_0 L \cdot (1-e^{-R}) \cdot dt$, wherein $I_0$ represents the initial pollution status variable of the insulator; L represents an elimination coefficient; R represents the rainfall rate; t1 represents the time corresponding to the current pollution status of the insulator; and t2 represents a moment in future.

4. The method according to claim 1, wherein acquiring the current pollution status of the insulator comprises:
   determining a basic pollution status based on the position of the insulator in a pollution area distribution; and
   determining the current pollution status after updating the basic pollution status.

5. The method according to claim 4, wherein the pollution area distribution is a second pollution area distribution determined based on a first pollution area distribution and the insulator pollution grade calculating model, and the first pollution area distribution is determined based on the historical data.

6. The method according to claim 5, wherein determining the second pollution area distribution based on the first pollution area distribution and the insulator pollution grade calculating model comprises:
   determining the insulator pollution grade of each lattice point based on the first pollution area distribution and the insulator pollution grade calculating model; and
   determining the second pollution area distribution based on the insulator pollution grade of each lattice point.

7. The method according to claim 1, wherein the prediction data comprises at least one of: weather data, environment data, and geographic data.

8. The device according to claim 7, wherein the pollutant reduction prediction is at least associated with rainfall rate contained in the prediction data.

9. The device according to claim 8, wherein the pollutant reduction prediction is represented by equation $\int_{t1}^{t2} I_0 L \cdot (1-e^{-R}) \cdot dt$, wherein $I_0$ represents the initial pollution status variable of the insulator; L represents an elimination coefficient; R represents the rainfall rate; t1 represents the time corresponding to the current pollution status of the insulator; and t2 represents a moment in future.

10. A device for predicting insulator pollution grade, the device comprising:
    a processor communicatively coupled to a memory, the processor configured to:
    acquire prediction data affecting the insulator pollution grade;
    acquire the current pollution status of the insulator;
    predict the insulator pollution grade based on the prediction data, the current pollution status and an insulator pollution grade calculating model, wherein the insulator pollution grade calculating model at least includes the initial pollution status variable of the insulator, and a pollutant accumulation prediction and a pollutant reduction prediction on the basis of the initial pollution status variable, wherein the pollutant accumulation prediction is at least associated with air density, air speed and humidity contained in the prediction data, and
    wherein the pollutant accumulation prediction is represented by equation $\int_{t1}^{t2} \rho DV \cdot e^{-r^2+RH} \cdot dt$, in which D represents average sea salt concentration in the area which the insulator is located in, ρ represents the air density, V represents the air speed, r represents the vertical distance from the insulator to coastline, RH represents the relative humidity of the air, t1 represents the time corresponding to the current pollution status of the insulator; and t2 represents a moment in future;
    at least one of the accumulation prediction and the reduction prediction being associated with the prediction data, and the initial pollution status variable being associated with the current pollution status;
    determine the probability that pollution flashover occurs on the insulator based on the predicted insulator pollution grade and an insulator pollution flashover model, wherein the pollution flashover model represents a relationship between the insulator pollution grade and pollution flashover occurrence;
    generate a visual presentation of the current pollution status of the insulator;
    generate a disaster warning, wherein classification of the disaster warning is based at least in part on the pollutant accumulation prediction; and
    adjust a routing for an inspection and cleaning plan for the insulator based on the current pollution status of the insulator.

11. The device according to claim 10, wherein the processor is further configured to:
  determine a basic pollution status based on the position of the insulator in the pollution area distribution; and
  determine the current pollution status after updating the basic pollution status.

12. The device according to claim 11, wherein the pollution area distribution is a second pollution area distribution determined based on a first pollution area distribution and the insulator pollution grade calculating model, and the first pollution area distribution is determined based on the historical data.

13. The device according to claim 12, wherein the processor is further configured to:
  determine the insulator pollution grade of each lattice point based on the first pollution area distribution and the insulator pollution grade calculating model; and
  determine the second pollution area distribution based on the insulator pollution grade of each lattice point.

14. The device according to claim 10, wherein the prediction data comprises at least one of: weather data, environment data, and geographic data.

* * * * *